Patented June 27, 1939

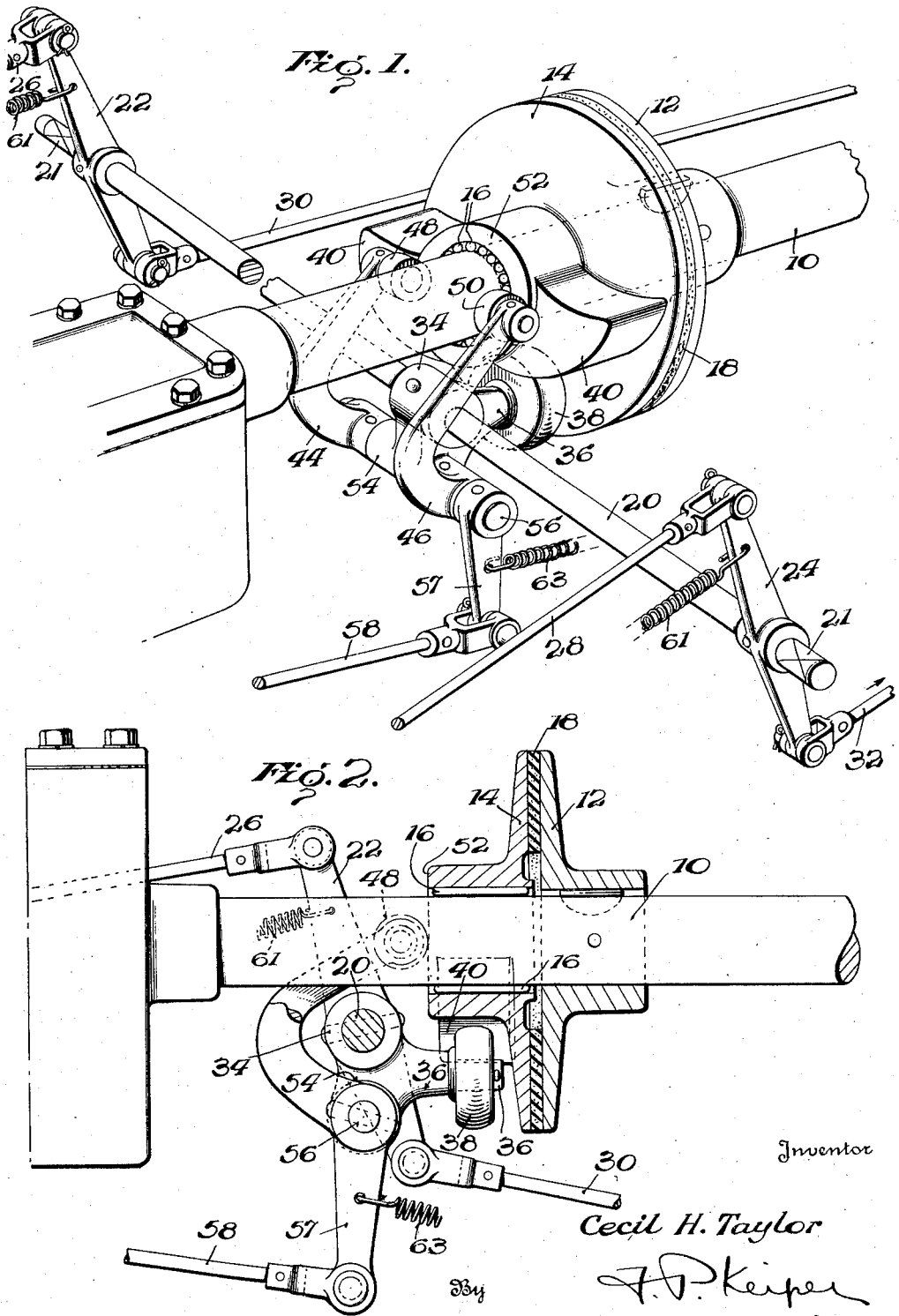

2,163,897

UNITED STATES PATENT OFFICE 2,163,897

BRAKE

Cecil H. Taylor, South Bend, Ind., assignor to Bendix Products Corporation, South Bend, Ind., a corporation of Indiana Application November 9, 1936, Serial No. 109,962

6 Claims. (Cl. 188—140)

This invention relates to brakes and more particularly to a system of mechanical servo power brakes adapted for automotive vehicle use.

More particularly the invention relates to a power braking mechanism adapted to derive its power from an engine-driven shaft or to employ the momentum of the vehicle through its propeller shaft for supplying a large portion of the effort required to apply the wheel brakes, the mechanism being peculiar in that through a simple arrangement of levers, the manual effort employed to apply the wheel brakes may be proportional to the wheel brake applying force, while the movement of the manual control remains substantially in proportion to the movement of the wheel brake applying linkage.

In the arrangement employed for illustration of the invention, a friction device in the form of a disc clutch is employed, one of the friction members being keyed to the power or propeller shaft of a vehicle, and the other being adapted to be frictionally engaged with the former, in varying degrees of normal pressure by manual operation, there being provided a suitable linkage for transmission of torque from the latter friction member to a wheel brake linkage to apply brakes. In the present invention there is provided, in such a system, a simplified arrangement whereby the force applied manually to engage the clutch members may be substantially in proportion to the wheel brake applying force, and wherein the degree of movement of the manual control may be proportional to the movement of the wheel brake applying linkage.

Accordingly, an object of the invention is to provide a mechanism for accomplishing the foregoing of extreme simplicity, reliability and of rugged construction.

A further object of the invention is to provide a simple mechanism for deriving power from a rotating member to apply brakes, which derived power may be proportionally subject to the force and applying movement imparted to a manual control element.

Still another object of the invention is to provide a simple mechanical system including a pair of levers for deriving power from the propeller shaft of a vehicle to apply wheel brakes, the system being under the control of a manual element such that movement of the manual element will be in proportion to the wheel brake application and the force exerted on the manual element will be proportional to the force exerted on the wheel brakes.

Yet another object of the invention is to provide a mechanical servo power brake which is position-sensitive and pressure-sensitive in accordance with the coefficient of friction of the friction facing employed in the friction device.

The above and other novel features of the invention will appear more fully hereinafter from the following detailed description, when taken in conjunction with the accompanying drawing. It is expressly understood, however, that the drawing is employed for purposes of illustration only and is not designed as a definition of the limits of the invention, reference being had for this purpose to the appended claims.

In the drawing wherein similar reference characters refer to similar parts throughout the several views:

Fig. 1 is a perspective view of the invention illustrating its essential details, and Fig. 2 is a longitudinal section through the propeller shaft of Fig. 1 further illustrating the details thereof.

Referring to the drawing more particularly, there is illustrated a propeller shaft 10, or equivalent shaft which may form a reliable source of power from which to actuate a brake system, the propeller shaft being preferable due to its usual fixed drive to the wheels of the vehicle. On the propeller shaft is keyed and fixed a friction disc 12, and a friction plate 14, which latter is supported on anti-friction bearings 16 and is adapted for longitudinal movement into and out of engagement with the disc 12. Any suitable friction lining, such as 18, may be applied to either the disc 12 or the plate 14 or both, as may be found desirable.

For simplicity of arrangement, there is provided a transversely-extending wheel brake operating cross shaft 20 journalled at 21 and having suitable levers 22 and 24 at either end with linkages 26 and 28 adapted for actuation of front wheel vehicle brakes and linkages 30 and 32 for actuation of rear wheel vehicle brakes. It will, of course, be understood that the portion of the propeller shaft which may be chosen must always bear a fixed relation to the cross shaft and the propeller shaft employed may be an extension of the tail or driven shaft of the usual transmission or gear box.

Centrally located and keyed to the cross shaft is a bell crank or lever 34, one extremity 36 of which extends substantially parallel to the propeller shaft 10 and carries thereon a roller 38 adapted to engage a symmetrical cam 40 forming, in the embodiment shown, an integral part of the friction plate 14, the arrangement being such that upon rotation of the friction plate in either direction the roller 38 is driven away from the propeller shaft, rotating the cross shaft 20 and applying the brakes.

For the purpose of controllably engaging the friction plate with the friction disc, a pair of levers 44 and 46 forming a fork or yoke are provided, the ends of which may be provided with rollers 48 and 50 adapted to engage a face 52 of the hub of the friction plate 14. The levers 44 and 46 are rigidly secured and keyed to a shaft 56 journalled in the extremity of the other arm 54 of the bell crank 34.

For manual control a lever 57 is also keyed to the shaft 56, and any suitable linkage 58 connected thereto for operation by a manual control or pedal as may be found desirable.

In operation a pull on the manual control linkage 58 will tend to rock the lever 54 of the bell crank 34 applying the brakes, but at the same time force the levers 44 and 46, and their roller extremities 48 and 50 into engagement with the hub end face 52 of the plate 14, thus forcing the plate into engagement with rotating friction disc 12. The plate 14 will thus be caused to rotate with a force depending upon the engagement pressure between plate 12 and disc 14, and in so doing will force one end or the other of cam 40 into engagement with roller 38, thus applying a turning or brake-applying force to the cross shaft 20, which, in turn, is coupled to the wheel brakes. It will be seen that such force is in substantially direct proportion to the force applied to the link 58, and that with turning of the cross shaft 20 in applying the wheel brakes, the stub shaft 56 moves in the direction of pull on link 58, thereby permitting the manually-orerated link 58 to move substantially in proportion to the brake application movement since the rollers 48 and 50 substantially form a fixed fulcrum for the rigid lever assembly 44, 46 and 57 once the plate and disc are in engagement.

Thus the position of the manual control linkage 58 accurately indicates the degree of brake application. By moving the linkage 58 a certain amount, the rotation of the cross shaft resulting from the power derived from the cam through arm 36 acts to move the pivot point 56, relieving the pressure of the rollers 50 and 48 and the friction pressure to create a "follow-up" or balance of forces depending on the position of the manual control linkage.

Thus there is provided a system employing a relatively simple pair of mechanical levers for deriving power braking having the desirable characteristics outlined. It will, of course, be understood that the shape of the cams 40 may be varied to produce a varying ratio between manual effort and derived braking effort, if desired, and that the linkages and levers and return springs 61 and 63 may be varied in size and length and position to suit conditions, and the form skillfully altered to permit of housing or enclosing in a suitable casing as may be desired.

Though only one embodiment of the invention has been illustrated and described, it is to be understood that the invention is not limited thereto but may be embodied in various mechanical forms all employing the same principle. For example, the relation of the parts to the vehicle may be altered by placing the relatively stationary disc behind the rotating disc and altering the lever system accordingly. As such changes in construction and arrangement of parts may be made without departing from the spirit of the invention, as will be apparent to those skilled in the art, reference will be had to the appended claims for a definition of the limits of the invention.

What is claimed is:

1. A mechanical servo power brake comprising, a wheel brake operating cross shaft, a power shaft transverse thereto and spaced therefrom, a friction disc fixed to said power shaft, a freely-rotatable friction disc axially movable into and out of engagement with said fixed disc, a cam carried by said rotatable disc, a crank arm secured to said cross shaft having a follower engaging said cam, a second crank arm on said cross shaft and a control lever extending substantially parallel to and fulcrumed on said second crank arm and adapted to axially move said rotatable disc into varying degrees of frictional engagement with said fixed disc.

2. A mechanical servo power device comprising, an operating lever, a rotating power shaft having a variable friction device for deriving a variable torque therefrom, means for transmitting said torque to said operating lever to apply brakes, and a control lever fulcrumed on the operating lever eccentric to the fulcrum thereof for varying the operation of the friction device and the torque derived therefrom.

3. A mechanical servo power brake comprising, an operating lever, wheel brake operating linkage actuated thereby, a vehicle propeller shaft having a friction device, the frictional engagement of which may be varied for deriving variable torques therefrom, means including a double cam for transmitting said torque to said operating lever regardless of the direction of said torque, and a control lever fulcrumed on the operating lever eccentric of the fulcrum of the operating lever, said control lever extending substantially parallel to a line extending through the axes of said fulcrums and adapted to control the engagement of said frictional device.

4. A power shaft, a brake shaft transverse thereto and spaced therefrom, a disc secured to said power shaft, a friction disc axially and rotatably mounted on said power shaft and having a radially-extending cam, a bell crank on said brake shaft having an arm extending substantially parallel to said power shaft and carrying a follower in engagement with said cam, and an arm extending substantially perpendicular to said power shaft and away therefrom, and a lever fulcrumed on said last named arm and adapted to axially thrust said rotatable disc into engagement with said fixed disc, to derive a torque from the power shaft, the torque derived from said rotatable disc and cam being adapted to rotate said bell crank and brake shaft in the same direction as the reaction of the fulcrum of said lever.

5. In a motor vehicle mechanical power servo brake system, a drive shaft, a brake-operating cross shaft adjacent but transverse thereto, a disc fixed to said drive shaft, a cam disc axially and freely rotatably mounted on said drive shaft, a thrust face on said cam disc for forcing the cam disc into frictional engagement with said fixed disc, a bell crank on said cross shaft having a cam follower adapted for engagement with said cam disc mounted on one end thereof, and a bifurcated lever fulcrumed in the other end of the bell crank and adapted to bear against said thrust face.

6. A mechanical servo power brake comprising, a wheel brake operating cross shaft, a power shaft transverse thereto and spaced therefrom, friction means fixed to said power shaft, a freely-rotatable friction shoe movable into and out of engagement with said fixed means, a cam carried by said rotatable shoe, a crank arm secured to said cross shaft having a follower engaging said cam, a second crank arm on said cross shaft and a control lever extending substantially parallel to and fulcrumed on said second crank arm and adapted to move said rotatable shoe into varying degrees of frictional engagement with said fixed means.

CECIL H. TAYLOR.